United States Patent [19]

Eda et al.

[11] Patent Number: 5,445,237
[45] Date of Patent: Aug. 29, 1995

[54] ELECTRIC POWER STEERING APPARATUS

[75] Inventors: Hiroshi Eda; Kenji Someya; Isamu Chikuma, all of Maebashi, Japan

[73] Assignee: NSK Ltd., Tokyo, Japan

[21] Appl. No.: 363,337

[22] Filed: Dec. 23, 1994

[30] Foreign Application Priority Data

| Dec. 27, 1993 | [JP] | Japan | 5-069757 U |
| Jul. 13, 1994 | [JP] | Japan | 6-161028 |
| Jul. 22, 1994 | [JP] | Japan | 6-171227 |

[51] Int. Cl.⁶ ............................................. B62D 5/04
[52] U.S. Cl. ............................................. 180/79.1
[58] Field of Search ............................. 180/79.1, 132

[56] References Cited

U.S. PATENT DOCUMENTS

| 5,078,225 | 1/1992 | Ohmura et al. | 180/79.1 |
| 5,145,021 | 9/1992 | Nakamura et al. | 180/79.1 |
| 5,165,495 | 11/1992 | Fujii | 180/79.1 |
| 5,213,173 | 5/1993 | Konishi et al. | 180/79.1 |
| 5,230,397 | 7/1993 | Tranchon | 180/79.1 |
| 5,248,009 | 9/1993 | Takehara et al. | 180/79.1 |
| 5,267,625 | 12/1993 | Shimizu | 180/79.1 |

FOREIGN PATENT DOCUMENTS

| 60-179944 | 11/1985 | Japan . |
| 3-253463 | 11/1991 | Japan . |
| 4-5168 | 1/1992 | Japan . |
| 281,654 | 6/1928 | United Kingdom . |

Primary Examiner—Mitchell J. Hill
Attorney, Agent, or Firm—Shapiro and Shapiro

[57] ABSTRACT

An electric power steering apparatus having a compact and inexpensive backlash mechanism is provided by arranging its structure to easily adjust the backlash of the bevel gear mechanism, and at the same time, to pre-press the bearings so that the movement of the shaft in the axial direction can be regulated. The rotational shaft having a small gear coupled thereto which constitutes a bevel gear mechanism on one side is rotatively supported by a housing, but disabled to shift in the axial direction. The large gear which constitutes the bevel gear mechanism on the other side is coupled to the output shaft of a steering system so that it can shift in the rotational direction and axial direction together with the shaft. The output shaft is rotatively supported by bearings with respect to the housing with a movable sleeve which abuts upon the outer ring of the bearing. The movable sleeve can be driven in from the outside by means of an adjustment screw so that the backlash between the small and large gears can be adjusted, while the inner ring of the bearing can be driven in with respect to the output shaft by means of a lock nut to tighten the bearing which abuts upon the outer ring of the output shaft. In this way, the inner rings of the bearings are pressed inwardly themselves, hence removing the play thereof.

3 Claims, 6 Drawing Sheets

ELECTRIC POWER STEERING APPARATUS

BACKGROUND OF THE INVENTION

1. Field of the Invention

This invention relates to an electric power steering apparatus.

2. Related Background Art

For vehicles and the like, there is known an electric power steering apparatus which detects by means of a torque sensor the steering torque generated in the steering system, and outputs an auxiliary torque to the steering system in accordance with the detected value by driving an electric motor connected to the steering system.

Among such electric power steering apparatuses, some of them are arranged to position the rotational shaft of an electric motor in the direction rectangular to the output shaft of the steering system due to the limited space or the like for the motor to be installed. In an electric power steering apparatus of the kind, the rotational shaft of the electric motor and the output shaft of the steering system are coupled by use of a bevel gear or highpoid gear mechanism in order to transmit the driving power while reducing the speed.

In the electric power steering apparatus described above, one problem is encountered that the backlash must be set appropriately between the engaging gears in the bevel gear or highpoid gear mechanism. If the backlash is too small, the engaging gears are caused to compete with each other. On the other hand, if the backlash is too large, the surfaces of the engaging gears are caused to collide with each other due to the abrupt variation of torque. As a result, there is a possibility that not only the hammering noises are generated, but also, the tooth of the gears is damaged, thus making it difficult to transmit the torque smoothly.

In the conventional technique, therefore, the structure is designed for a gear mechanism of the kind to adjust the backlash by installing the gears on one side in the bevel gear or highpoid gear mechanism to a shaft member, while supporting these gears by means of bearings to make them correlatively movable with respect to the gears on the other side by use of spacers of a given thickness provided to intervene between the shaft member and the bearings. However, according to the structure thus designed, the assembly is carried out by measuring the dimensions before the assembly so that the backlash can be estimated or the backlash must be measured once after the assembly in order to make the adjustment by trial and error by replacing spacers again. It takes a considerable time and labor to execute these types of work.

In the meantime, there is a structure disclosed in Japanese Patent Laid-Open Application No. 4-5168 whereby to adjust the backlash in such a manner that the gears on one side in the bevel gear or highpoid gear mechanism are mounted on the shaft member, and supported by means of bearings to make them correlatively movable with respect to the gears on the other side, and then, the position of the bearings in the axial direction is adjusted by means of adjusting plugs.

According to this structure, it is possible to adjust the backlash from the outside after the assembly by use of the adjusting plugs, but the movement of the shaft member in the axial direction is suppressed just by one bearing. As a result, when an excessive torque is transmitted, there is a possibility that the shaft member can move greatly in the axial direction within a range of play existing in the bearing. Thus depending on the magnitude of the power of an auxiliary steering, an increased backlash is invited, leading to the creation of the same problem as described above. Also, if a smaller backlash is set at the time of assembly, there is encountered a problem that the backlash becomes too small at the time of usual operation.

Further, in the highpoid gears and the like, both the driving and driven gears are conically formed. Thus the engaging relationship between them is unique such as its axes being orthogonal to or offset with each other. Therefore, it is a common practice that the driving gear is supported by a cantilever bearing.

However, in the electric power steering apparatus according to the conventional technique described above, the driving pear is supported by a cantilever bearing. Therefore, when a load is given to pears, a moment is generated in the bending direction of the shaft on which the driving gear is mounted. Thus the bearing is allowed to function as a fulcrum while the engaging section of the gears becomes the point of application. As a result, due to this bending of the shaft, the abutting positions of the gear tooth are caused to shift, thereby to invite the deviated abrasion of the gear tooth and the increased noises of gear engagement as well. Meanwhile, the driven gear is caused by the shaft of the driving gear thus bent to displace its engaging tooth away from the tooth of the driving gear, hence inviting the increased backlash. In some cases, the driven gear itself is caused to shift in the bending direction of the shaft.

Meanwhile, in an electric power steering apparatus of the kind, a detector is provided in a housing for detecting the steering power exerted on the input shaft so that the electric motor can be controlled.

Now, for the power transmission mechanism made of iron or the like, a lubricant suitable for use of a low-speed and heavy load must be applied in order to reduce the friction and the like. On the other hand, for the detector, a lubricant suitable for use of a high-speed and light load must be applied. However, since these two members are arranged in one and the same housing, there is a fear that if these two different kinds of lubricants are used, a mixture takes place during operation, thus lowering the performance of these lubricants. Also, there is a fear that an adverse effect is produced on the function of the detector by the iron particles generated when the gears engage with each other in the power transmission mechanism. Therefore, it is arranged in a certain type of the conventional electric power steering apparatus that at least gears on one side in the power transmission mechanism are made of resin so that the mechanism is operative even in a state where no lubricant is applied. A measure is also taken to prevent the generation of iron particles. However, the power transmission mechanism of this type cannot transmit a high torque. Therefore, it is desired to provide an electric power steering apparatus having a power transmission mechanism capable of transmitting a higher torque.

SUMMARY OF THE INVENTION

It is an object of this invention to provide an electric power steering apparatus having a compact and inexpensive backlash mechanism capable of easily adjusting the backlash of a bevel gear mechanism, and regulating the shift of the shaft member in the axial direction with a structure arranged to provide the bearings with a pre-load.

It is another object of this invention to provide a simply structured electric power steering apparatus whose reliability and others are improved by enhancing the rigidity with which to support the gears in a bevel gear mechanism.

It is still another object of this invention to provide an electric power steering mechanism whose reliability, durability and others are improved while being provided with a power transmission mechanism capable of transmitting a high torque.

In accordance with the invention, an electric power steering apparatus comprises:

a housing;

means for detecting steering torque to detect a torque generated in the steering system;

an electric motor provided with a rotational shaft for generating a rotational power according to the result of detection by the aforesaid means for detecting steering toque; and a transmission mechanism to transmit the rotational power of the aforesaid electric motor to the steering system, including a bevel gear mechanism in which a small gear coupled to the rotational shaft of the aforesaid electric motor is allowed to engage with a large gear coupled to the output shaft of the steering system whose axis is not in parallel with that of the small gear.

In this electric power steering apparatus, the rotational shaft having the aforesaid small gear coupled thereto is rotatively supported by the housing, but not enabled to move in the axial direction;

the large gear is coupled to the output shaft of the steering system so that it can move in the rotational and axial directions together with the output shaft;

the output shaft is rotatively supported by a first bearing and a second bearing with respect to the housing;

each of the bearings comprises an outer ring and an inner ring, and rolling elements pinched by these rings, respectively, and the outer ring of the first bearing is supported movably in the axial direction with respect to the housing, while the inner ring of the first bearing is installed on the output shaft so that its movement is restricted at least in the direction away from the second bearing, and the inner ring of the second bearing is supported movably in the axial direction with respect to the output shaft;

there are further provided a first shifting member which drives the outer ring of the first bearing to move it correlatively in the axial direction with respect to the housing, and a second shifting member which drives the inner ring of the second bearing to move it correlatively in the axial direction with respect to the output shaft;

the output shaft moves in the axial direction by the drive of the first shifting member through the outer ring, rolling elements, and inner ring of the first bearing, hence allowing the tooth face of the small gear and that of the large gear to approach closely; and by the drive of the second shifting member, the outer ring of the second bearing abuts upon the first shifting member, and then, in a state that the first and second bearings are prevented from shifting in the direction of the outer rings approaching themselves closely, the inner rings of the first and second bearings are caused to shift themselves further in the approaching direction, hence removing the play to be generated in the first and second bearings.

In an electric power steering apparatus of the present invention, the output shaft is caused to shift in the axial direction by the drive of the first shifting member through the outer ring, rolling elements, and inner ring of the first bearing, thus making it possible to allow the gear tooth of the small gear and that of the large gear to approach each other closely; and by the drive of the second shifting member, the outer ring of the second bearing abuts upon the first shifting member, and then, in a state that the first and second bearings are prevented from shifting in the direction of the outer rings approaching themselves closely, the inner rings of the first and second bearings are caused to shift themselves further in the approaching direction, hence removing the play to be generated in the first and second bearings.

In this way, with a simple structure which enables an easy operation, it is possible to attain the provision of an appropriate backlash of the bevel gear mechanism, and to remove the play of bearings.

In accordance with the invention, an electric power steering apparatus comprises:

a housing;

a motor mounted on the housing to rotate the rotational shaft;

an output shaft for transmitting the steering power in order to steer the wheels;

an input shaft for coupling the steering wheel and the output shaft; and a bevel-geared power transmission mechanism structured by the driving gears mounted on the rotational shaft, and the driven gears mounted on the output shaft, which engage with the driving gears to provide a power transmission efficiency of at least 80% or more both for the normal and reverse driving.

In this electric power steering apparatus, the aforesaid rotational shaft is rotatively supported on both sides of the shaft having on it the driving gears between them with respect to the housing.

According to an electric power steering apparatus of the invention, the rotational shaft is rotatively supported with respect to the housing on both sides of the shaft having on it the driving gears between them. Therefore, the bending of the rotational shaft can be suppressed to the utmost, thus making it possible to prevent the increased backlash, the deviated abutting position of gear tooth, and other drawbacks from being caused to occur in the bevel-geared power transmission mechanism.

In accordance with the invention an electric power steering apparatus comprises:

a housing;

a motor mounted on the housing to generate an auxiliary steering power;

an output shaft for transmitting the steering power in order to steer the wheels;

an input shaft for coupling the steering wheel and the output shaft;

a detector for detecting the steering power transmitted to the input shaft; and a power transmission mechanism for transmitting the auxiliary steering power of the motor to the output shaft by the engagement of at least two transmitting elements.

In this electric power steering apparatus, the aforesaid housing is formed by a first chamber and a second chamber, and in the first chamber, the detector is arranged, while in the second chamber, the transmitting elements of the power transmission mechanism are caused to engage with each other, and further, sealing means is provided to separate the first and second chambers airtightly.

An electric power steering apparatus according to the invention, the first chamber having the detector in it, and the second chamber in which the transmitting elements of the power transmission mechanism engage with each other are separated airtightly by sealing means. Therefore, the lubricants in each of the chambers are not mixed, and any foreign substances generated in one chamber are not allowed to enter the other, either. In this way, whereas the high torque can be transmitted, the liability and durability of the apparatus can be enhanced.

DETAILED DESCRIPTION OF THE PREFERRED EMBODIMENTS

Hereinafter, with reference to the accompanying drawings, the description will be made of the embodiments according to the present invention.

Figure 1:
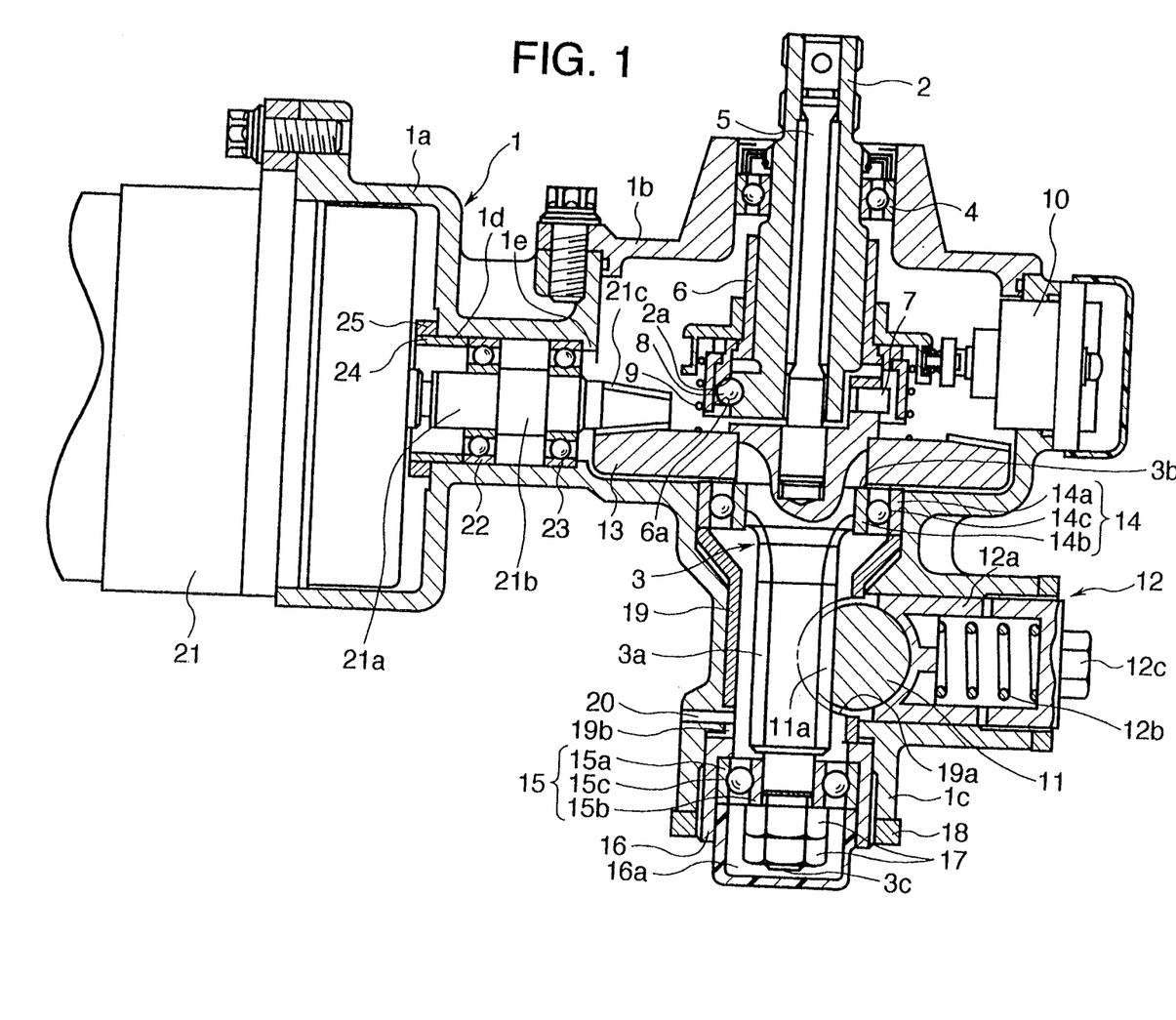
FIG. 1 is a cross-sectional view which shows the principal part of an electric power steering apparatus in the axial direction according to an embodiment of the present invention.

FIG. 1 is a cross-sectional view which shows the principal part of an electric power steering apparatus according to a first embodiment of the present invention. In FIG. 1, an input shaft 2 and an output shaft 3 are extendedly provided in a housing 1 comprising the main body 1a and the covering member 1b. The upper end of the hollow input shaft 2 is connected to a steering shaft which is not shown, and rotatively supported by a bearing 4 with respect to the housing 1. In this respect, for the reasons which will be described later, the inner ring of the bearing 4 is loosely fitted over the outer circumference of the input shaft 2. A torsion bar 5, one end of which is coupled to the input shaft 2, and the other end, to the output shaft 3, is extendedly present in the input shaft 2.

A detector is arranged to detect the steering torque on the basis of the torsion bar 5 which is twisted in proportion to the received torque on the circumference of the lower end of the input shaft 2. This detector comprises a slider 6 fitted over the input shaft 2 to be correlatively rotative, and shiftable in the axial direction; a pin 7 whose inner end is inserted into the groove formed at the upper end of the output shaft 3, and whose outer end is extendedly present in the slider 6; steel balls 8 movably provided in the space formed by the inner surface of the spiral groove 2a arranged on the outer circumference of the lower end side of the input shaft 3, and the recess 6a of the slider 6; a spring 12 which biases the slider 6 upward; and a potentiometer 10 connected to the outer circumference of the slider 6 for measuring the amount of shift of the slider 6. In this respect, this detector is known as represented by the disclosure of Japanese Utility Model Laid-Open Application No. 60-179944. Therefore, the details of its structure will be omitted in the description given below.

In the central part of the output shaft 3, a pinion gear 3a is formed to engage with the rack tooth 11a of a rack shaft 11 which is extendedly provided in the vertical direction toward the plane of FIG. 1. The rack shaft 11 is connected to the wheels through a steering mechanism which is not shown. The rack shaft 11 is supported from behind by means of a known rack supporter 12 comprising a rack guide 12a, a spring 12b, and a lock member 12c so that it is pressed toward to the pinion gear 3a.

On the outer circumference of the upper end of the output shaft 3, a large gear 13, that is, a large bevel gear, is fixedly mounted by the application of shrinkage fit or the like. In the vicinity of the large bevel gear 13 at the upper end of the output shaft 3, an upper bearing 14 is fitted. The upper bearing 14, that is, a first bearing, comprises an outer ring 14a, an inner ring 14b, and balls 14c pinched between the rings. For the reasons which will be described later, the outer ring 14a is loosely fitted with respect to the housing 1. On the other hand, the inner ring 14b abuts upon the step 3b which is formed on the upper end of the output shaft 3a. Thus it is arranged that the upper bearing 14 is not allowed to shift upward with respect to the output shaft 3.

At the lower end of the output shaft 3, a lower bearing 15, that is, a second bearing, is fitted. The lower bearing 15 comprises an outer ring 15a, an inner ring 15b, and balls 15c pinched between the rings. The outer ring 15a is supported by the housing 1 through an almost annular adjustment screw 16. The adjustment screw 16 is formed to be narrower in its depth. When the inner ring 15b of the lower bearing 15 is shifted upward by tightening the lock nut 17 which fits to the male screw 3c formed at the lower end of the output shaft 3, the outer ring 15a and the adjustment screw 16 abut upon each other. In this respect, the male screw 3c and the lock nut 17c constitute a second shifting member.

Further, on the outer circumference of the adjustment screw 16, the male thread 16a is formed to set it in the female thread 1c of the housing 1. The nut 18 screwed on the male thread 16a if provided with a locking function. In this respect, as it is clear from FIG. 1, there is a given gap between the inner ring of the lower bearing 15 and the pinion tooth 3a of the output shaft 3 so that the lower bearing 15 is allowed to shift in the axial direction with respect to the output shaft 3.

On the circumference of the output shaft 3, an almost annular movable sleeve 19 is provided. The upper end of the movable sleeve 19 abuts upon the outer ring 14a of the upper bearing 14. The lower end thereof abuts upon the bottom of the adjustment screw 16. On the circumference of the rack shaft 11 of the movable sleeve 19, a cut off portion 19a is formed in a size larger than the cross-section of the rack shaft 11 so as not to stand in the way when the pinion gear 3a and the rack tooth 11a engage with each other at the time that the movable sleeve 19 is caused to shift. Also, in the vicinity of the lower end of the movable sleeve 19, there is formed a vertical groove 19b which is extendedly present in a given distance in the axial direction, and a detent pin 20 planted in the housing 1 is inserted into the vertical groove 19b. In this way, the movable sleeve 19 is allowed to shift in the axial direction with respect to the housing 1, but is disabled to rotate correlatively. In this respect, the adjustment screw 16 and the movable sleeve 19 constitute a first shifting member.

On the left side end of the housing 1, an electric motor 21 is installed. The electric motor 21 is provided with a rotational shaft 21a which is rotatively supported by the bearings 22 and 23 with respect to the housing 1. In the central part of the rotational shaft, a portion 21b having a larger diameter is formed with the both sides thereof being pinched by the bearings 22 and 23. The right side of the bearing 23 abuts on the step 1e formed on the housing 1, while the left side of the bearing 22 abuts on the annular screw member 24. The bearings 22 and 23 are mounted immovably in the axial direction with respect to the housing 1 by the male thread 24a formed on the outer circumference of the annular screw member 24 which is driven in the female thread 1d formed on the housing 1. In this respect, a nut 25 which is screwed on the male thread 24a has a function of screw locking. The electric motor 21 is connected to a driving device which is not shown. This device receives the output of a potentiometer 10, vehicle speed, and other information, and supplies a given electric power to the electric motor for the generation of an appropriate auxiliary torque.

The rotational shaft 21a is arranged with respect to the output shaft 3 so that the axes thereof are rectangular to each other. On the leading end of the rotational shaft 21a, there is formed a small bevel gear 21c, that is, a small gear engaging with a large bevel gear 13. In this respect, the large bevel gear 13 and the small bevel gear 21c constitute a bevel gear mechanism.

Now, the description will be made of the operation of an embodiment according to the present invention.

It is assumed that the vehicle is in a state of traveling straight ahead, and no steering power is inputted into the input shaft 2 through the steering wheel and steering shaft which are not shown. As a result, the slider 6 does not move correlatively with the input shaft 2. The potentiometer does not generate any output signal. The electric motor 21 does not generate any auxiliary torque, either.

When the driver operates the steering wheel (not shown) for the vehicle to run on a curve, the torsion bar 5 is twisted to generates a difference in the rotational phase between the input shaft 2 and output shaft 3 in accordance with the steering power. On the basis of this difference in the rotational phase, the slider 6 shifts vertically with respect to the input shaft 2 in the known mode, thus enabling the potentiometer 10 to output a signal in response to the direction and amount of shift of the slider 2. In accordance with this signal, the electric motor 21 generates an auxiliary steering power.

Now, the description will be made of the operation for setting the backlash appropriately between bevel gears.

Firstly, when it is intended to set the backlash appropriately between the bevel gears, the adjustment screw 16 is tightened or untightened while the lock nuts 17 and 18 are released in order to shift the movable sleeve 19 upward or downward. The outer ring of the upper bearing 14 is loosely fitted with respect to the housing 1, and the inner ring of the bearing 4 is also loosely fitted with respect to the input shaft 2. As a result, the input shaft 2, output shaft 3, large bevel gear 13, and the lower bearing 15 are shifted upward or downward together with the upper bearing 14. Because of this operation, the distance between the small bevel gear 21c and large bevel gear 13 is caused to change, thus making it possible to adjust the backlash. In this respect, even when the adjustment screw 16 is turned, the movable sleeve 19 is not allowed to rotate due to the function of the detent pin 20. The lock nuts 17 and 18 are tightened lastly. By tightening the lock nut 17 by the application of an appropriate torque, the inner and outer rings of the upper and lower bearings 14 and 15 are caused to shift in the direction to press the balls. In this way, while the rotation is allowed, the play in the bearings is removed, hence making it possible to make the looseness of the output shaft 3 smaller in its axial direction.

Then, when it is intended to make the backlash smaller after the assembly, the nut 18 is removed, and the adjustment screw 16 is tightened to shift the movable sleeve 19 upward. Thus the input shaft 2, output shaft 3, large bevel gear 13 and lower bearing 15 are caused to shift upward together with the upper bearing 14. By this operation, the distance between the tooth surface of the small bevel gear 21c and that of the large bevel gear 13 is made smaller. Hence the backlash is made smaller accordingly.

On the other hand, when it is intended to make the backlash larger after the assembly, the nut 18 is untightened, and the adjustment screw 16 (a right handed screw) is turned to the left. Then the lower bearing 15, output shaft 3, input shaft 2, large bevel gear 13, upper bearing 14, and movable sleeve 19 are caused to shift downward all together. By this operation, the distance between the tooth surface of the small bevel gear 21c and that of the large bevel gear 13 is made larger. Hence the backlash is made larger accordingly. At this juncture, a correlative sliding is needed between the movable sleeve 19 and the adjustment screw 16, but it is possible to meet such a need sufficiently only if the amount of the prepressure is set appropriately for the bearings 14 and 15, respectively. In this respect, it is unnecessary in principle to untighten the lock nut 17 when the backlash is adjusted after assembly.

So far the description has been made of the present invention with reference to an embodiment, but the present invention should not be interpreted limitedly only by the above-mentioned embodiment. It is of course possible for those skilled in the art to make various modifications and improvements without departing from the range of its purport. For example, it may be possible to structure the bevel gear mechanism by highpoid gears instead of bevel gears or it may also be possible to use simple bevel gears for the purpose as disclosed herein.

As described above, in the electric power steering apparatus according to the present invention, the output shaft moves in the axial direction through the rolling elements and the inner ring of the first bearing when the first shifting member is driven, thus the tooth surfaces of the small and large gears are caused to approach.

When the second shifting member is driven, the outer ring of the second bearing abuts upon the first shifting member, and then, the inner rings of the first and second bearings are further caused to shift themselves in its approaching direction in a state that the outer rings of the first and second bearings are prevented from being caused to shift themselves in its approaching direction.

Hence the play generated in the first and second bearings can be removed.

In this way, with a simple structure which enables an easy operation, it is possible to attain the provision of an appropriate backlash in the bevel gear mechanism and to remove the play of bearings.

Hereinafter, with reference to the accompanying drawings, the description will be made of another embodiment according to the present invention.

Figure 2:
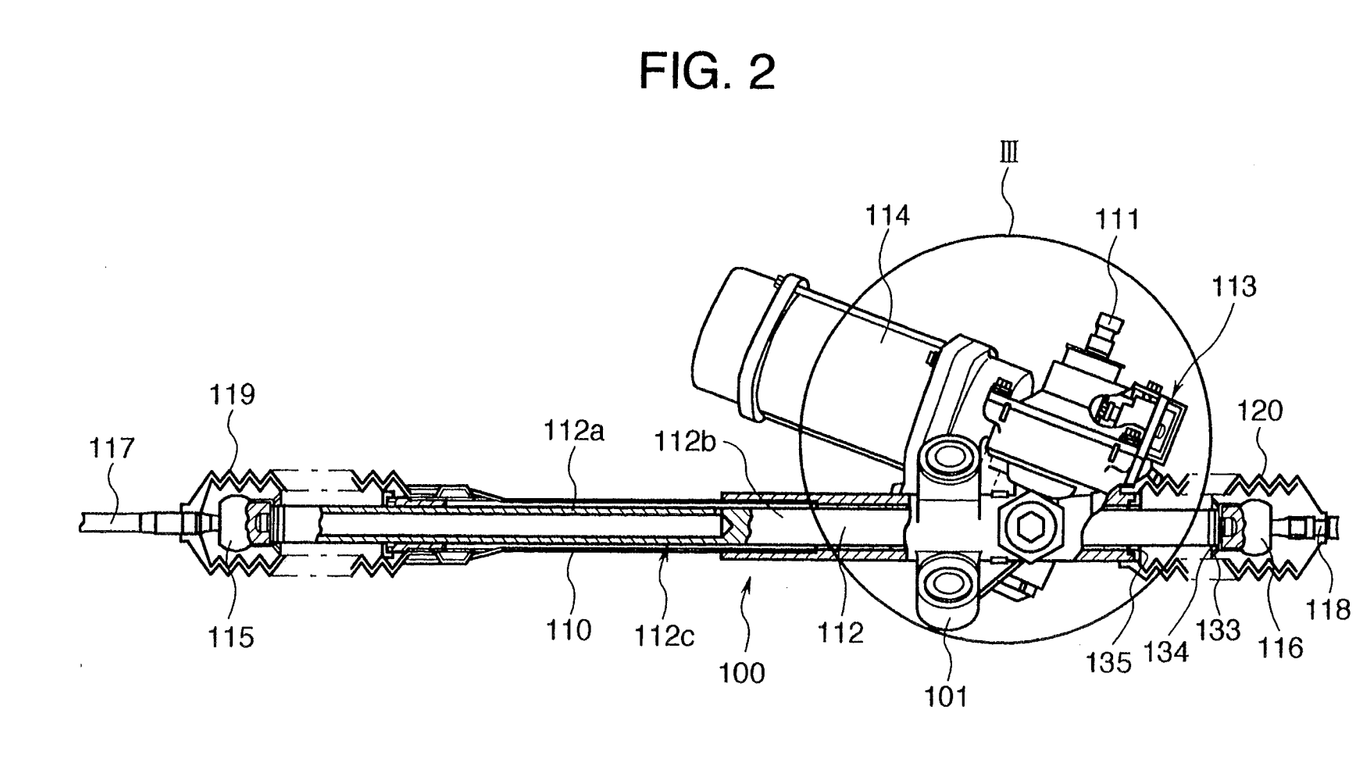
FIG. 2 is a partially sectional view which shows an electric power steering apparatus 100 according to an embodiment of the present invention.

FIG. 2 is a partially sectional view which shows an electric power steering apparatus 100 in the axial direction according to another embodiment of the present invention.

In FIG. 2, the electric power steering apparatus 100 is provided with the main body of housing 101, and a rack column 110 which is arranged extendedly from it. The main body of housing 101 and the rack column 110 are fixed to a car body (not shown) by means of a bracket (not shown) to constitute a housing integrally. In the inner side of the main body of the housing 101, an input shaft 111 is extendedly present diagonally from the above, and one end of this shaft is coupled to the steering shaft and steering wheel (not shown), while in the main body of housing 101 and the rack column 110, a rack shaft 112, that is, an output shaft, is extendedly present. At the lower end of the input shaft 111, a pinion (not shown) is formed to engage with the rack of the rack shaft 112, thus enabling the rack shaft 112 to move to the left and right by the rotation of the input shaft 111. In this respect, the rack shaft 112 comprises a hollow shaft 112a, a solid shaft 112b with the rack being formed on its outer face, and a welding portion 112c where these shafts are coupled.

A torque detector 113 is arranged in the main body of housing 101. This torque detector 113 detects the torque exerted on the input shaft 111 by utilization of a torsion bar, and outputs a signal value corresponding thereto.

Further, in the main body of housing 101, the speed reducing means (a bevel gear mechanism, for example) which is connected to the input shaft 111 is provided so that a power generated by the rotational shaft (see FIG. 3) of the electric motor 114 mounting on the main body of housing 101 is transmitted to the input shaft 111. In this respect, the torque detector 113 and the electric motor 114 are connected to a controller which is not shown.

On both ends of the rack shaft 112, ball joints 115 and 116 are mounted. On the ball joints 115 and 116, tie rods 117 and 118 are rotatively mounted, respectively. To the circumference of the ball joints 115 and 116, dust-proofing boots 119 and 120 are mounted.

Figure 3:
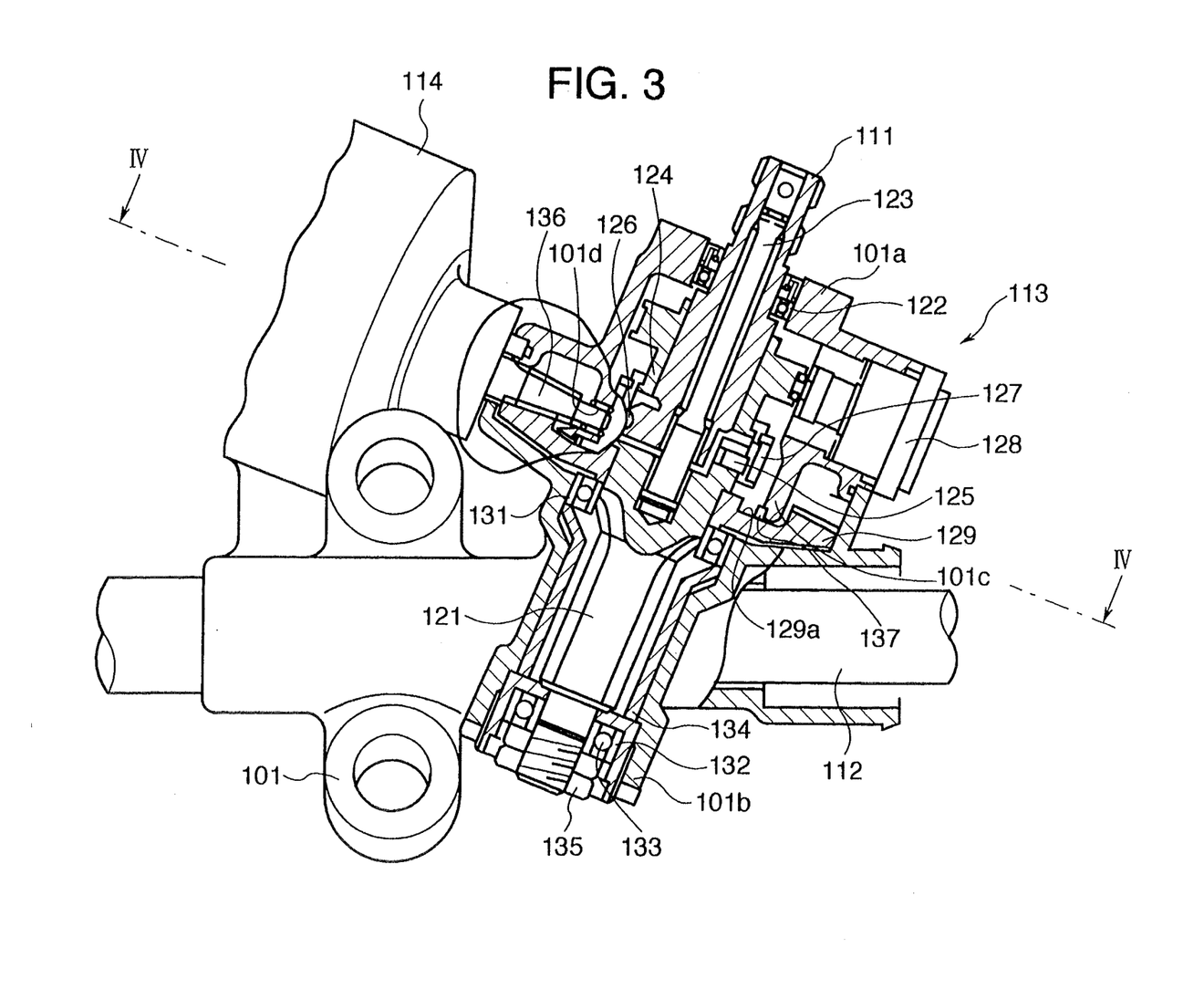
FIG. 3 is a partially sectional enlargement taken along circular line III of the electric power steering apparatus shown in FIG. 2.

FIG. 3 is a partially sectional enlargement of a portion of the electric power steering apparatus shown at III in FIG. 2. In FIG. 3, the housing 101 comprises a cover 101a and a base 101b. In the cover 101a, the input shaft 111 is extendedly present. The hollow input shaft 111 is rotatively supported by a bearing 122 with respect to the cover 101a. In the input shaft 111, a torsion bar 123 is extendedly present with its one end being coupled to the input shaft 111 and the other end to the output shaft 121.

A detector 113 is provided for detecting the steering torque based upon the fact that the torsion bar 123 is twisted in proportion to the torque to be received in the vicinity of the central portion of the input shaft 111. This detector 113 comprises a slider 124 which is correlatively rotative and movable in the axial direction with respect to the input shaft 111; a pin 125 whose inner end is fitted into a hole formed at the upper end of the output shaft 121 and outer end is inserted into the vertical groove formed at the lower end of the slider 124; balls 126 which are rotative in the space formed by the spiral groove formed by the outer circumference of the lower end of the input shaft 111 and the recess of the slider 124; a spring 127 which biases the slider 124 upward; and a potentiometer 128 connected to the outer circumference of the slider 124 for measuring the shifting amount of the slider 124 in the axial direction. In this respect, a detector of the kind is known as represented by Japanese Utility Model Laid-Open Application No. 60-179944. Therefore, the details of its structure will be omitted in the description given below.

At the upper end of the output shaft 121, a large highpoid gear 129 is mounted rotatively together with the output shaft 121. In the vicinity of the large highpoid gear 129 at the upper end of the output shaft 121, an upper bearing 131 is fitted thereon. At the lower end of the output shaft 121, a lower bearing 132 is fitted thereon. The circumference of the lower bearing 132 is supported by the base 101b through a first sleeve 133 fitted in the base 101b by means of a screw. Between the outer rings of the upper bearing 131 and the lower bearing 132, a second sleeve 134 is provided. At the lower end of the output shaft 121, a nut 135 is fitted thereon by means of a screw.

The large highpoid driven gear 129 engages with a small highpoid driving gear 136 which is formed on the rotational shaft (see FIG. 4) connected to the electric motor 114. When the first sleeve 133 is caused to rotate with respect to the base 101b, it can enter the interior of the base 101b or exit therefrom freely, hence making it possible to adjust the distance between the tooth surfaces of the large highpoid gear 129 and the small highpoid gear 136, that is, backlash between them. In this respect, the pair of the highpoid gears according to the present embodiment are provided with a transmission efficiency of 80% or more both in the normal and reverse directions of power transmission.

In the inner side of the cover 101a of the housing 101, there is provided an inner cylinder 101c whose lower end is extended to the vicinity of the upper surface of the large highpoid gear 129. The upper surface of the large highpoid gear 129 is formed to be an annular plane 129a. Upon the plane 129a, abuts airtightly a seal 137 mounted on the lower end of the inner cylinder 101c. On the side wall of the inner cylinder 101c, a hole 101 is formed coaxially with the small highpoid gear 136.

Figure 4:
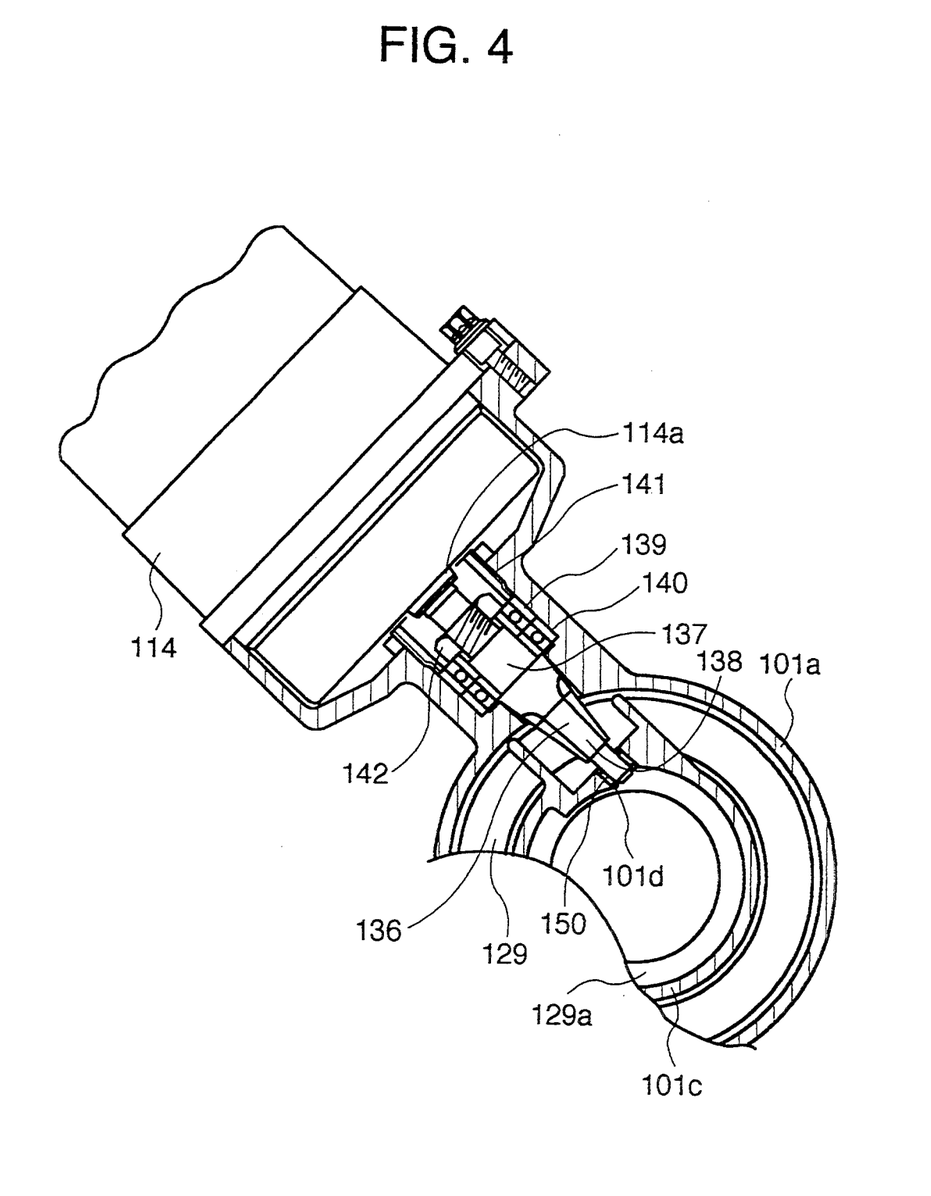
FIG. 4 is a partially sectional view of the electric power steering apparatus obtained by cutting off along line IV—IV in FIG. 3.

FIG. 4 is a partially sectional view obtained by cutting off the electric power steering apparatus along line IV—IV in FIG. 3. In FIG. 4, the electric motor 114 is provided with a driving shaft 114a for output. On the leading end of the driving shaft 114a, a female spline (not shown) is arranged. A rotational shaft 147 is provided coaxially with the driving shaft 114a. The leading end of the rotational shaft 147, a male spline (not shown) is formed, and by enabling the splines to engage with each other, it is possible to couple them rotatively together. As described above, the small highpoid gear 136 is formed on the end of the rotational shaft 147 on the side opposite to the motor. From the small highpoid gear 136, a supporting cylinder 138 is extendedly provided toward the interior of the housing. The supporting cylinder 138 advances into the hole 101d formed on the inner cylinder 101c where it is rotatively supported through a bearing 150. Having a sealing function, the bearing 150 separates airtightly the interior and exterior of the inner cylinder 101c in cooperation with a seal 137 (see FIG. 3). In this respect, as clear from FIG. 4, the axes of the large and small highpoid gears are offset from being rectangular to each other.

The rotational shaft 147 is rotatively supported by angular contact ball bearings 139 and 140 with respect to the main body 101a. The axial position of the angular contact ball bearings 139 and 140 is determined by a nut 142, while its correlative relationship of the angular contact ball bearings 139 and 140 with the main body 101a is determined by means of a screw member 141. As a result, the positional relationship between the rotational shaft 147 and the main body 101a is constant, thus making it possible to effectuate the backlash adjustment between the highpoid gears by means of the above-mentioned first sleeve (see FIG. 3).

Now, with reference to FIG. 2, the description will be made of the operation of the electric power steering apparatus according to the present embodiment. When a driver turns the steering wheel which is not shown, the input shaft 111 is caused to rotate, and the torque is transmitted to the output shaft 121 through the rack shaft 112. In this case, the value of the torque detected by the torque detector 113 is transmitted to a controller (not shown) where this value is compared with a predetermined value. If the torque exceeds the predetermined value, an auxiliary steering power is needed. Therefore, a driving instruction is issued to drive the electric motor 114. The electric motor 114 driven by this driving instruction causes the output shaft 121 to rotate through the highpoid gears, thus the rack shaft 112 being shifted in the axial direction. If the value detected by the torque detector 113 is lower than the predetermined value, no auxiliary steering power is needed. Thus the electric motor 114 is not driven.

Now, in FIG. 4, if the electric motor 114 is driven so that a heavy load is exerted between the highpoid gears, a great moment is generated by the function of the power exerted between the tooth surfaces. Hence the rotational shaft 147 tends to be bent. However, the rotational shaft 147 is supported by the bearings on both sides with the small highpoid gear between them, that is, the so-called straddle mounting which presents an extremely high rigidity against bending. Therefore, the rotational shaft 147 is not caused to bend when receiving a moment of the kind. With this structure, the abutting position of the gear tooth is not caused to change depending on the magnitude of a load. The tooth engagement takes place in the same position at all times, thus making it possible to transmit the torque stably and enhance the abrasion resistance of the gears while reducing the gear noises.

Here, in this electric power steering apparatus, its assembly can be carried out easily because it is arranged to connect the electric motor 114 and the rotational shaft 147 by coupling the male and female splines after the rotational shaft 147 is assembled in the housing 101.

So far the present invention has been described with reference to the embodiment, but the present invention should not be interpreted limitedly just by referring to the above-mentioned embodiment. It is of course possible for those skilled in the art to make modifications and improvements without departing from its purport. For example, the highpoid gears may be replaced with bevel gears.

As set forth above, in accordance with the present invention, the electric power steering apparatus rotatively supports the rotational shaft connected to the electric motor on both sides with respect to the housing while having the driving gear thereon between both sides, hence making it possible to suppress the bend of the rotational shaft to the utmost. In this way, the increased backlash, the deviation of the tooth abutting positions, and other drawbacks are prevented from being generated in the bevel-geared power transmission mechanism.

Now, with reference to the accompanying drawings, the description will be made of still another embodiment according to the present invention.

Figure 5:
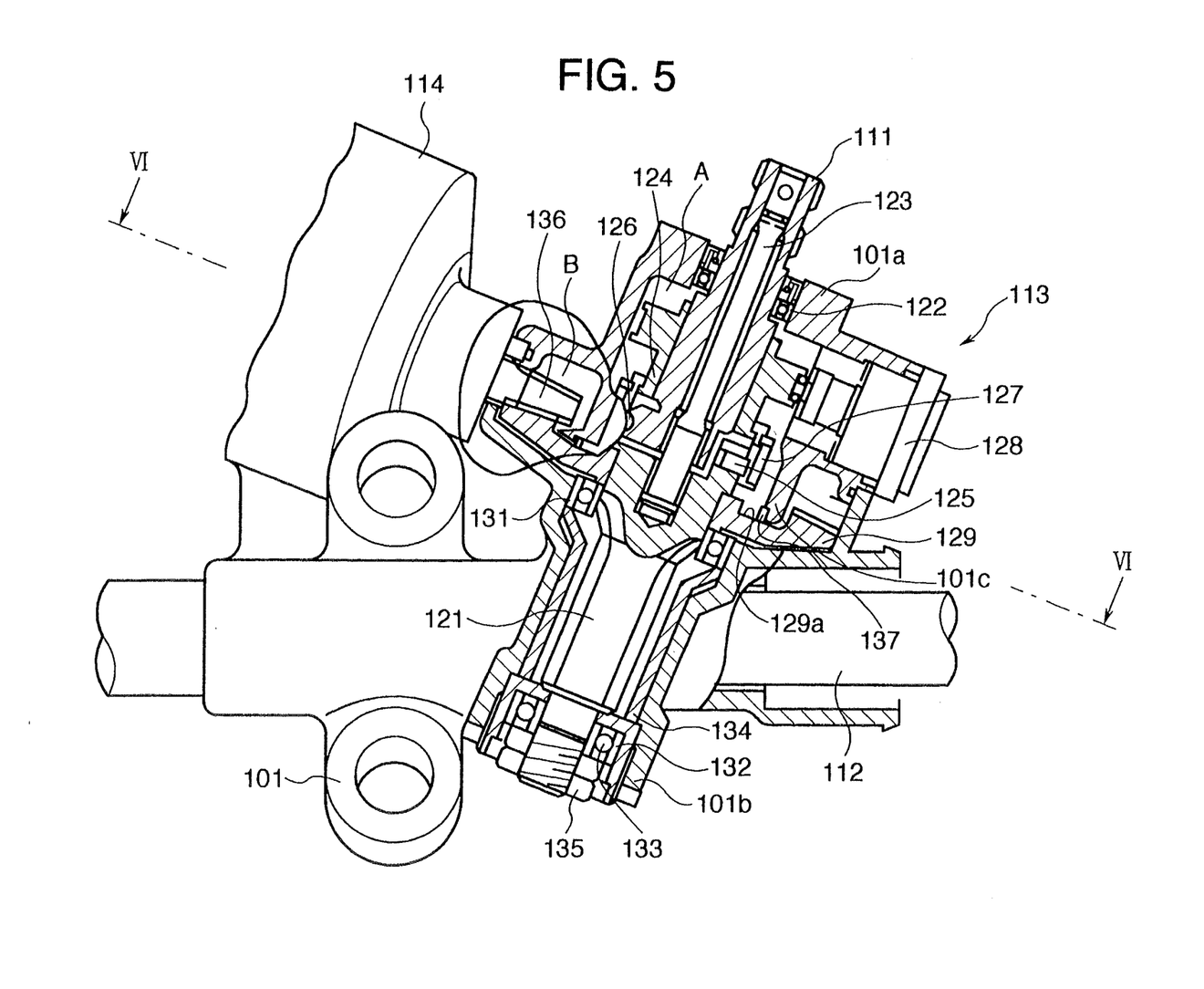
FIG. 5 is a partially sectional enlargement of the same portion of an electric power steering apparatus as in FIG. 3 according to another embodiment of the present invention.
Figure 6:
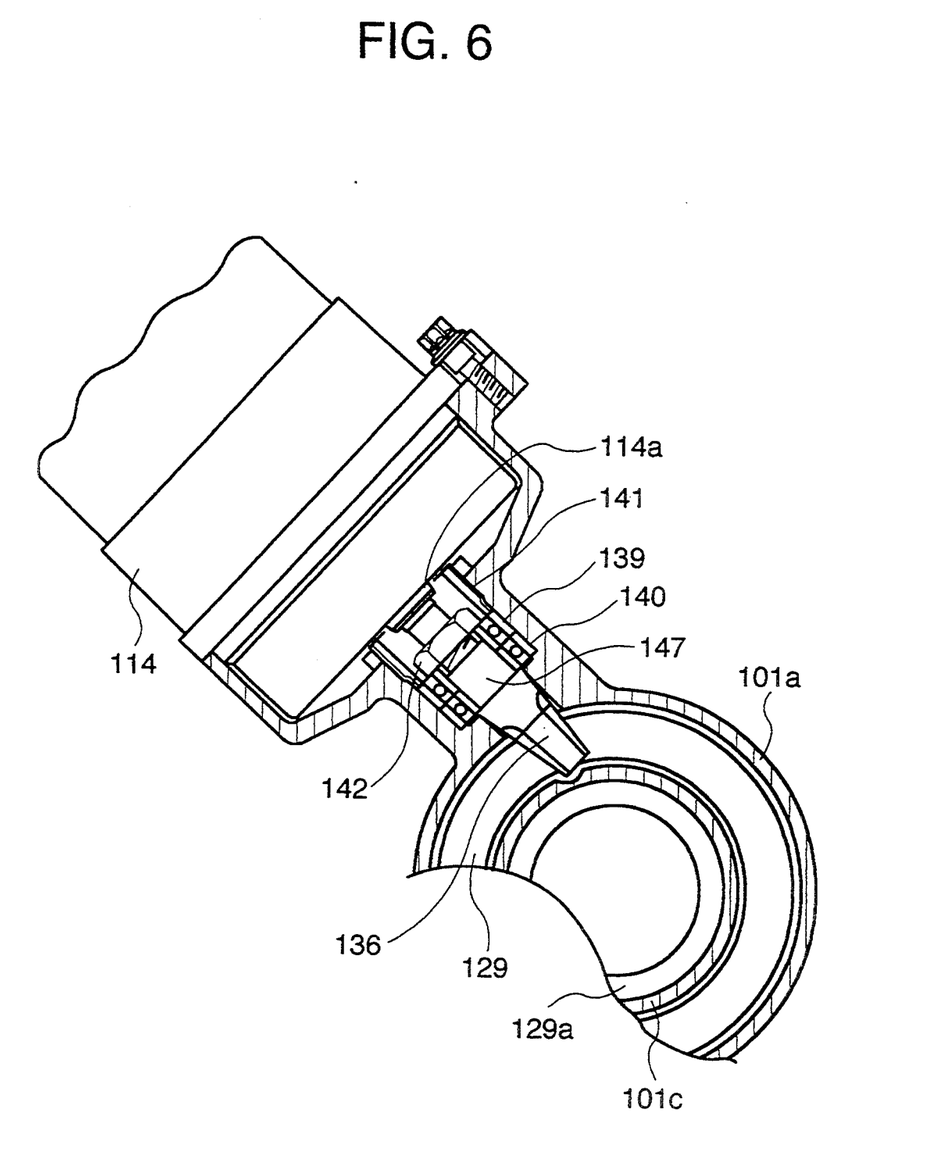
FIG. 6 is a partially sectional view of the electric power steering apparatus taken along line VI—VI in FIG. 5.

FIGS. 5 and 6 are cross-sectional views which represent an electric power steering apparatus according to still another embodiment of the present invention. Since the present embodiment is structured in the same manner as the above-mentioned embodiment, the description will be made of those parts which differ therefrom. Therefore, the description of the same portion will be omitted.

In the present embodiment, there is provided no supporting cylinder (designated at 138 in FIGS. 3 and 4) which is formed from the small highpoid gear 136 extendedly toward the interior of the housing. Also, there is no hole (at 136 in FIG. 3) formed on the side wall of the inner cylinder 101c of the housing 101.

Therefore, a sealing 137 (see FIG. 5) separates a second chamber B which is outside the inner cylinder 101c, and a first chamber A which is inside it airtightly. As clear from FIG. 5, the highpoid gears made of carbon steel engage with each other in the second chamber B while the detector 113 is arranged in the first chamber A. In this respect, as clear from FIG. 6, the axes of the large and small highpoid gears are arranged to be offset from its orthogonal state.

Now that the first chamber A and second chamber B are separated by the sealing 137 airtightly, it is possible to prevent a comparatively high viscous lubricant for use of reducing abrasion of highpoid gears at the time of engagement from being mixed with a comparatively low viscous lubricant for use of the sliding section of the detector 113 in order to enhance the durability of the gears and the liability of the detector. Also, it is possible to prevent the iron particles generated by the gears engaging with each from entering the first chamber A, thus further enhancing the reliability of the detector 113.

So far the description has been made of the present invention with reference to the embodiment, but the present invention should not be interpreted limitedly just by the reference to the above-mentioned embodiment. It is of course possible for those skilled in the art to make modifications and improvement appropriately. For example, as the transmission elements, bevel gears or worm gears may be employed or traction rollers or the like may be used instead of the highpoid gears. In this respect, although needless to mention, the coupling of transmission elements does not means any engagement of teeth, but a pressurized contact when traction rollers or the like are employed.

As set forth above, in accordance with the present invention, the electric power steering apparatus is arranged to separate by sealing means the first chamber where the detector is provided and the second chamber in which the transmission elements of the power transmission mechanism are coupled, thus making it possible to prevent the lubricant in each chamber from being mixed, and also, to prevent any foreign particles generated in one chamber from entering the other chamber. In this way, the reliability and durability of the apparatus can be enhanced significantly irrespective of the high transmission capability thus obtained.

What is claimed is:

1. An electric power steering apparatus, comprising a housing;

means for detecting steering torque to detect the steering torque generated in a steering system;

an electric motor provided with a rotational shaft for generating a rotational power according to the result of detection by said means for detecting steering torque; and a transmission mechanism to transmit the rotational power of said electric motor to the steering system, said transmission mechanism including a bevel gear mechanism in which a small gear coupled to the rotational shaft of said electric motor is allowed to engage with a large gear coupled to the output shaft of said steering system whose axis is not in parallel with that of the small gear, wherein said rotational shaft having said small gear coupled thereto is rotatively supported by said housing, but not enabled to move in the axial direction;

said large gear is coupled to the output shaft of said steering system so that it can move in the rotational and axial directions together with said output shaft;

said output shaft is rotatively supported by a first bearing and a second bearing with respect to said housing;

each of said bearings comprises an outer ring and an inner ring, and rolling elements pinched by said rings, respectively, and the outer ring of said first bearing is supported movably in the axial direction with respect to said housing, while the inner ring of said first bearing is installed on the output shaft so that its movement is restricted at least in the direction away from said second bearing, and the inner ring of said second bearing is supported movably in the axial direction with respect to said output shaft, and there are further provided a first shifting member to drive the outer ring of said first bearing to move it correlatively in the axial direction with respect to said housing, and a second shifting member which drives the inner ring of said second bearing to move it correlatively in the axial direction with respect to said output shaft;

said output shaft moves in the axial direction by the drive of said first shifting member through the outer ring, rolling elements, and inner ring of said first bearing, hence allowing the tooth face of said small gear and that of said large gear to approach closely; and by the drive of said second shifting member, the outer ring of said second bearing abuts upon said first shifting member, and then, in a state that said first and second bearings are prevented from shifting in the direction of the outer rings approaching themselves closely, the inner rings of said first and second bearings are caused to shift themselves further in the approaching direction, hence removing the play to be generated in said first and second bearings.

2. An electric power steering apparatus according to claim 1, wherein said bevel gear mechanism is provided with a power transmission efficiency of at least 80% or more for both normal and reverse transmission, and said rotational shaft is rotatively supported on both sides with respect to said housing with said small gear being mounted thereon between them.

3. An electric power steering apparatus according to claim 1, wherein said housing comprises a first chamber and a second chamber, and in said first chamber, said detector is arranged, and in said second chamber, the gears of the power transmission mechanism engage with each other, and further, sealing means is provided for separating said first chamber and said second chamber airtightly.

* * * * *